(12) United States Patent
Wu et al.

(10) Patent No.: US 7,593,839 B1
(45) Date of Patent: Sep. 22, 2009

(54) METHOD FOR OPTIMIZING DESIGN AND REHABILITATION OF WATER DISTRIBUTION SYSTEMS

(75) Inventors: Zheng Y. Wu, Watertown, CT (US); Thomas M. Walski, Nanticoke, PA (US); Robert F. Mankowski, Watertown, CT (US); Gregg A. Herrin, Burlington, CT (US); Wayne R. Hartell, Waterbury, CT (US); Jonathan DeCarlo, Oakville, CT (US); Benjamin D. Wilson, Keene, NH (US)

(73) Assignee: Bentley Systems, Incorporated, Exton, PA (US)

( * ) Notice: Subject to any disclaimer, the term of this patent is extended or adjusted under 35 U.S.C. 154(b) by 715 days.

(21) Appl. No.: 10/379,353

(22) Filed: Mar. 4, 2003

Related U.S. Application Data

(60) Provisional application No. 60/363,121, filed on Mar. 7, 2002.

(51) Int. Cl.
G06F 7/60 (2006.01)
G06F 17/10 (2006.01)
G06G 7/50 (2006.01)
(52) U.S. Cl. ............................................. 703/9; 703/2
(58) Field of Classification Search ...................... 703/9
See application file for complete search history.

(56) References Cited

U.S. PATENT DOCUMENTS

| | | | |
|---|---|---|---|
| 5,511,188 A | 4/1996 | Pascucci et al. | |
| 5,758,347 A | 5/1998 | Lo et al. | |
| 5,787,283 A | 7/1998 | Chin et al. | |
| 6,119,125 A | 9/2000 | Gloudeman et al. | |
| 6,247,019 B1 | 6/2001 | Davies | |
| 6,829,566 B2* | 12/2004 | Sage | 702/183 |
| 7,302,372 B1* | 11/2007 | Wu et al. | 703/9 |
| 2005/0273300 A1* | 12/2005 | Patwardhan et al. | 703/9 |

OTHER PUBLICATIONS

D. Halhal, G.A. Walters, D. Ouazar, and D.A. Savic, "Water network rehabilitation with structured messy genetic algorithm," Journal of Water Resources Planning and Management, vol. 123, No. 3, pp. 137-146, 1997.*
Wu, "Automatic Model Calibration by Simulated Evolution", 1994.*
Boulos et al., "Optimal Pump Operation of Water Distribution Systems Using Genetic Algorithms".*

(Continued)

*Primary Examiner*—Kamini S Shah
*Assistant Examiner*—David Silver
(74) *Attorney, Agent, or Firm*—Cesari and McKenna LLP

(57) ABSTRACT

A method and system for optimal design of a water distribution network is provided. Three levels of optimization are available as options for selection by the user and these include least cost optimization, maximum benefit optimization and cost-benefit tradeoff optimization. The optimization models, in accordance with the present invention, include solutions generated by a competent genetic algorithm that can take into account multiple objective functions. Pareto-optimal solutions are produced for the whole range of a budget for the water distribution system. Tradeoff solutions allow engineers to apply engineering judgement to choose the true optimal solution under the specific application being considered.

14 Claims, 5 Drawing Sheets

OTHER PUBLICATIONS

Haested, "WaterCAD for Windows" User's Guide Version 4.0, 2001, pp. 175-188, cover.*
Haestad Methods, "WaterCAD for Windows" Version 5, User's Guide, pp. 224, 225, cover.*
Advantica, "High Pressure Saltwater Pipeline Rehabilitation", 2000, http://www.advantica.biz/Files/62000.pdf.*
Haestad, WaterCAD for Windows Version 3.0 Online-Help Text, 1995-1997, pp i-x, 7-56 to 8-35.*
D. Halhal, G.A. Waiters, D. Ouazar, and D.A. Savic, "Water network rehabilitation with structured messy genetic algorithm," Journal of Water Resources Planning and Management, vol. 123, No. 3, pp. 137-146, 1997.*
Wu Z, Simpson A. Competent Genetic-Evolutionary Optimization of Water Distribution Systems. Journal of Computing in Civil Engineering [serial online]. Apr. 2001;15(2):89. Available from: Computer & Applied Sciences Complete, Ipswich, MA. Accessed May 5, 2009.*
Boulos, Paul F. et al. Explicit Calculation of Pipe-Network Parameters. Journal of Hydraulic Engineering, vol. 116, No. 11, Nov. 1990, ASCE.
Wu, Zheng Yi et al. Calibrating Water Distribution Model Via Genetic Algorithm. AWWA IMTech Conference, Apr. 14-16, 2002, Kansas City, MO.
Wu, Zheng et al. Using Genetic Algorithms to Rehabilitate Distribution Systems. Nov. 2001, Journal AWWA.
Wu, Zheng et al. Optimal Capacity Design of Water Distribution Systems. 1st ASCE Annual Environmental and Water Resources System Analysis (EWRSA) Symposium, May 19-22, 2002, Roanoke, VA.
Zitzler, Eckart et al. Evolutionary Algorithm Based Exploration of Software Schedules for Digital Signal Processors. Genetic and Evoluntionary Computation Conference, Orlando, FL, Jul. 1999.
Ben Chie Yen, Chapter 6: Hydraulics of Sewer Systems, Dept. of Civil & Environmental Engineering, Univ. of Illinois at Urbana-Champaign, pp. 6.1-6.113.
Engineering Computer Applications Committe, "Calibration Guidelines for Water Distribution System Modeling", Proceedings of AWWA 1999 ImTech Conference, American Water Works Association, 1999, pp. 1-17.
Harding, et al., "Back to MIKE NET Support Forum", (http://www.bossintl.com/forums/showthread/s/06d85824alfe498e3bd7ae505115aad6/threa...), Boss International, 2003, pp. 1-4.
"WaterCAD", (http://web.archive.org/web/20000118153014/http://haestad.com/software/watercad/default...), Haestad Methods, Waterbury, CT, 2000, pp. 1-4.
"WaterCAD v4.1: Version Comparsion Chart", (http://web/archive/org/web/20001211214100/http://haestad.com/software/watercad/version...), Haestad Methods, Waterbury, CT, 2000 pp. 1-2.
Walski, et al., "Back to MIKE NET Forum", (http://www/bossintl.com/forums/showthread.php/s/b5e99c3b9dca5caebb02c3ea015d0b4/...), Boss International, 2003, pp. 1-9.
Babaovic, et al., "Automatic Calibration of Pipe Network Hydraulic Model", DHISoftware.com, Conference Proceedings of the $4^{th}$ DHI Software Conference, Jun. 6-8, 2001, pp. 1-8.
Solomatine, D. P., "Genetic and Other Global Optimization Algorithms—Comparison and Use in Calibration Problems", Proceedings of the $3^{rd}$ International Conference on Hydroinformatics, Copenhagen, Denmark, 1998, Balkema Publishers, 10 pp.

"Genetic Algorithms in Water Resources Engineering", Current Methods, vol. 1, No. 1, Heastad Methods, Waterbury, CT, pp. 119-123.
Vairavamoorthy, et al., "Optimal Design of Water Distribution Systems Using Genetic Algorithms", Computer-Aided Civil & Infrastructure Engineering, Sep. 2000, vol. 15, Issue 5, p. 374-382.
Farmani, et al., "Discrete Optimisation of Water Distribution Networks Using Genetic Algorithms", International Conference on Computing and Control for the Water Industry, 1999, Exeter, UK, pp. 427-436.
Farmani, et al., "Multi-Criterion Optimal Design of Water Distribution Networks Using Genetic Algorithm", Association for Structural and Multidisciplinary Optimization / International Society of Structural and Multidisciplinary Optimization Conference, Jul. 1999, Ilkley, UK, pp. 157-163.
Walters, et al., "Calibration of Water Distribution Network Models Using Genetic Algorithms", Hydrosoft 1998 Hydraulic Engineering Software VII, Computational Mechanics Publications, Witpress, Como, Italy, 1998, pp. 131-140.
Wu, Zheng Yi, et al., "Calibrating Water Distribution Model Via Genetic Algorithms", AWWA IMTech Conference, Apr. 14-17, 2002, Kansas, MO, Haestad Methods, pp. 1-10.
Wu, Zheng Yi, et al., "Darwin Calibrator—Improving Project Productivity and Model Quality for Large Water Systems", Journal of AWWA, Oct. 2004, 7 pp.
Walski, Thomas, M., "Does Your Model Really Model Your Water Distribution System?", Public Works, Jun. 1987, 2 pp.
Walski, Thomas, M., "Equipment Needs for Field Data Collection in Support of Modeling", 1988, 17 pp.
Wu, Zheng Yi, et al., "Impact of Measurement Errors on Optimal Calibration of Water Distribution Models", International Conference on Technology Automation and Control of Wastewater and Drinking Systems, Jun. 19-21, 2002, Poland, 6 pp.
Walski, Thomas M. et al., "Pitfalls in Calibrating and EPS Model", Aug. 2000, pp. 1-10.
Walski, Thomas M., "Understanding the Adjustments for Water Distribution System Model Calibration", Journal of Indian Water Works Association, Apr.-Jun. 2001, pp. 151-157.
Wu, Zheng Yi, et al., "Vertification of Hydrological and Hydrodynamic Models Calibrated by Genetic Algorithms", Proceedings of the International Conference on Water Resources and Environmental Resources, vol. 2, Oct. 29-31, 1996, Kyoto, Japan, pp. 175-182.
"WaterCAD for Windows", Version 5 User Guide, Haestad Methods, Waterbury, CT, 2002.
Farmani, et al., "Parameter Estimation in Water Distribution Networks Using Genetic Algorithms", Identification in Engineering Systems—International Conference; $2^{nd}$, Swansea, Wales, UK, Mar. 1999, pp. 430-439.
WaterCAD for Windows: Version 5 User Guide, Heastad Methods, Inc., Waterbury, Connecticut, 2002.
"Historical Reconstruction of the Water-Distribution System Serving the Dover Township Area, New Jersey: Jan. 1962-Dec. 1996", Agency for Toxic Substances Registry U.S. Department of Health and Human Services, Atlanta Georgia, Sep. 2001.
Wu et al, U.S. Patent Application for a "Method and Apparatus for Automatic Water Distribution Model Calibration" U.S. Appl. No. 10/051,820, filed Jan. 17, 2002.
Z.Y. Wu and A.R. Simpson, "Competent Genetic-Evolutionary Optimization of Water Distribution Systems" Journal of Computing in Civil engineering, Apr. 2001.

* cited by examiner

METHOD FOR OPTIMIZING DESIGN AND REHABILITATION OF WATER DISTRIBUTION SYSTEMS

CROSS-REFERENCE TO RELATED APPLICATIONS

The present application claims the benefit of U.S. Provisional Patent Application Ser. No. 60/363,121, which was filed on Mar. 7, 2002, by Wu, et al. for a METHOD FOR OPTIMAL DESIGN AND REHABILITATION OF WATER DISTRIBUTION SYSTEMS and is hereby incorporated by reference.

BACKGROUND OF THE INVENTION

1. Field of the Invention

This invention relates generally to water distribution networks, and more particularly, to software tools for designing such networks.

2. Background Information

Water distribution systems represent a large portion of a water utility's asset and investment. Optimal design of a water distribution system is ideal and it is important for a company to make intelligent decisions on its investment in this asset. Over the years, an optimal design has traditionally been associated with a design that involves the least cost. The minimum cost warrants a lower investment. However, from a perspective of systematic analysis, the lowest cost does not necessarily yield an optimal return on the water utility company's investment.

More specifically, one of the ultimate goals of a system analysis is to maximize the net benefits (i.e. benefits—cost) of the system. The yield of a system can be measured by either its value or net benefit. For a water distribution system, the true value or the net benefit is a reliable water supply service having adequate quantity and good quality. For a water company, it is desirable to plan for the provision of sufficient water supply for the community not only at the present time, but also over a reasonable future-planning horizon. During this planning period, the amount of water required for a system or the demand can be estimated, but this has typically been performed with some uncertainty.

In many cases, a municipal body or town council, for example, will determine that a water distribution network is to be extended to include a new subdivision. In such a case the new subdivision is to be supplied with water carrying capacity. In many cases, the existing system must be evaluated to determine the effects that the new system will have on the existing system. For example, the decisions must be made whether the supply capacity will be enough not only to supply the new subdivision, but also to maintain the capacity or demand that exists with respect to the old system. Thus, the town council needs to determine how best to extend the network to include the new subdivision in order to service the new subdivision, and how or whether the existing portions of the system should be improved.

System design, by its nature, is governed by multiple criteria or objectives. Cost is often a primary criterion in design because, if the benefit is fixed, the least cost design results in the maximum net benefit. Conventionally, this assumption has been the foundation of the least cost design approach. However, the least cost design normally results in a minimum capacity for a water distribution system. A minimum cost design model is usually formulated to search for the least cost solution (pipe sizes) while satisfying the hydraulic constraints such as required junction pressures, maximum pipe flow velocities and hydraulic gradients for a given demand condition over a planning horizon. The cost is given as a tabular or numerical function of pipe diameters. To locate the minimum cost solution, the optimization search process is led to the minimum pipe sizes, thus a minimum capacity.

However, the least capacity is not necessarily the preferable solution for a long term systematic planning due to the uncertainty of the future demand. Some extra pipe capacity is beneficial to allow the supply to grow into its full capacity within a planning horizon and to account for uncertainty in demands and the need for reliability in case of outages. The pipe flow capacity needs to be considered as another criteria to evaluate the design solution, and not constrained to the minimum pipe sizes. Thus, the optimal design is no longer a single objective (minimizing cost), but a multi-objective (minimizing cost and maximizing flow capacity) optimization problem.

Prior techniques have allowed a user to evaluate the costs of the system or evaluate pipe flow capacities and make determinations on a trial and error basis about the best way to either build a new system or rehabilitate portions of an existing system. However, prior techniques have not given the user the capability of a trade off or a multi-objective design. In other words, a user may have a particular budget, and thus needs to maintain costs within that budget, yet would like to have a suggested pressure or flow at a particular location or overall in the system.

There remains a need therefore for a tool for designing a water distribution network that provides the user with a multi-objective approach for designing the water distribution system.

There remains a further need for a system that allows for designing a new system or rehabilitating an old system, which takes into account many trial solutions, based on either cost or capacity benefit.

In addition, when considering the benefits of a design and rehabilitation, an engineer usually takes into account the potential hydraulic performance improvement (the hydraulic benefit) and access hydraulic capacity (capacity benefit) and pipe rehabilitation improvement (rehabilitation benefit). There are times when one of these is more important than the other. A user might, in some circumstances, decide to design a system that focuses on pressure improvement so that the benefit of hydraulic performance, in which case is measured using junction pressure improvements. A flow benefit or capacity benefit might be the focus of a different engineer in another system. Prior techniques have not provided the user with the ability to determine which of these benefit functionalities are to be the focus of a rehabilitation of a system. There remains a need therefore for a software tool for the design of a water distribution network that allows a user to select between benefit objectives in such a manner that pressure benefits, flow benefits, rehabilitation benefits or unitized benefits can be identified as priorities in the design or rehabilitation of the water distribution network.

It is thus an object of the present invention to provide a software tool for the design of a water distribution network that allows a user to select the criterion for determining the optimal solutions based on the benefits to the system or rehabilitation.

In some cases, demand changes occur following initial pipe installation (Walski 2001). Thus, it is difficult to precisely forecast the demand, when installing the pipes and other components in the first instance. In order that the optimal design is produced for the maximum value or benefit for a water distribution system, an engineer must be able to determine the maximum net benefit—a surrogate of optimal capacity for the design.

System design, by its nature, is governed by multiple criteria or objectives. Cost is often a primary criterion in design because, if the benefit is fixed, the least cost design results in the maximum net benefit. Conventionally, this assumption has been the foundation of the least cost design approach. However, the least cost design normally is based on a minimum capacity for a water distribution system. A minimum cost design model is usually formulated to search for the least cost solution while satisfying the hydraulic constraints such as required junction pressures, maximum pipe flow velocities and hydraulic gradients for a given demand condition over a planning horizon. The cost is given as a tabular or numerical function of pipe diameters. To locate the minimum cost solution, the optimization search process is led to the minimum pipe sizes.

However, the least capacity is not necessarily a preferable solution for a water distribution system, particularly for long term systematic planning. This is due, in part, to the uncertainty of future demands. Some extra pipe capacity is beneficial to allow the supply to grow into its full capacity within a planning horizon and to account for uncertainty in demands and the need for reliability in case of outages. The pipe flow capacity needs to be considered as another criteria to evaluate the design solution, and not constrained to the minimum pipe sizes. Thus, the optimal design is no longer a single objective (minimizing cost), but a multi-objective (minimizing cost and maximizing flow capacity) optimization problem.

Up to the present, there have not been effective multi-objective optimizations algorithms. In order to solve multi-objective optimizations, the problem was transformed into a single-objective optimization problem by using two adjustments including a weighted sum of objectives and a ϵ-constraint methods. The weighted sum approach applies a set of weighting factors to all the objectives and sums up the weighted objectives to construct a composite single objective. But, this solution is not typically reliable unless the weights are correctly chosen which can be difficult. The weighted-objective approach is in fact a simplified approach for multi-objective optimization. It converts multi-objectives into a single objective and solves the problem with a single optimization paradigm. It is not able to locate the optimal tradeoff solutions (so-called Pareto optimal solutions) of all the original objectives.

The constraint method chooses one of the objective functions as the single objective, and treats the other objective functions as constraints. Each of the constraints is limited to a prescribed value. The optimal solution, however, depends on the pre-defined constraint limits. Thus, in both cases used in prior techniques there must be a contrived set of values that may or may not give rise to a realistic set of solutions.

There remains a need, therefore, for the design of a water distribution system that allows multi-objective approach for designing an optimized cost-benefit water distribution system, without lumping together single objectives to be solved for multiobjectives.

It is thus an object of the present invention to provide a water distribution design method and system that readily allows for multi-objective optimization, including the objectives of minimizing costs while maximizing various benefit characteristics of the network being designed or rehabilitated.

SUMMARY OF THE INVENTION

The disadvantages of prior techniques are overcome by the present invention which is a method for optimized design and rehabilitation for a water distribution system that is formulated as the optimal tradeoff between the cost and benefit. The tradeoff optimization problem is solved by using a competent genetic algorithm. It concurrently optimizes at least two conflicting objectives and produces a set of Pareto optimal (i.e. non-dominated, non-inferior cost-benefit tradeoff) solutions. In accordance with the present invention, the water distribution network designer can make informed decisions using these criteria to obtain the resulting network design that meets the network designer's objectives. More specifically, the program of the present invention allows the water engineer to design a water distribution system for practical conditions to achieve the goal of the maximum cost efficiency and benefit. The software handles single and/or multiple objectives for the design and rehabilitation of the network. The optimization model can be established to include the combination and aggregation of sizing new pipes and rehabilitating old pipes, multiple demand loading conditions and various boundary system conditions. This will enable a modeler to optimize either an entire water system or a portion of the system with the minimum cost and maximum benefit. The cost effective design and/or rehabilitation solution can be determined by the least cost, the maximum benefit or the trade-off between the cost and benefit. A user is able to select any one of three optimization models to best suit his project needs, and the optimization process can be customized during run time if so desired by the design engineer, or other user.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
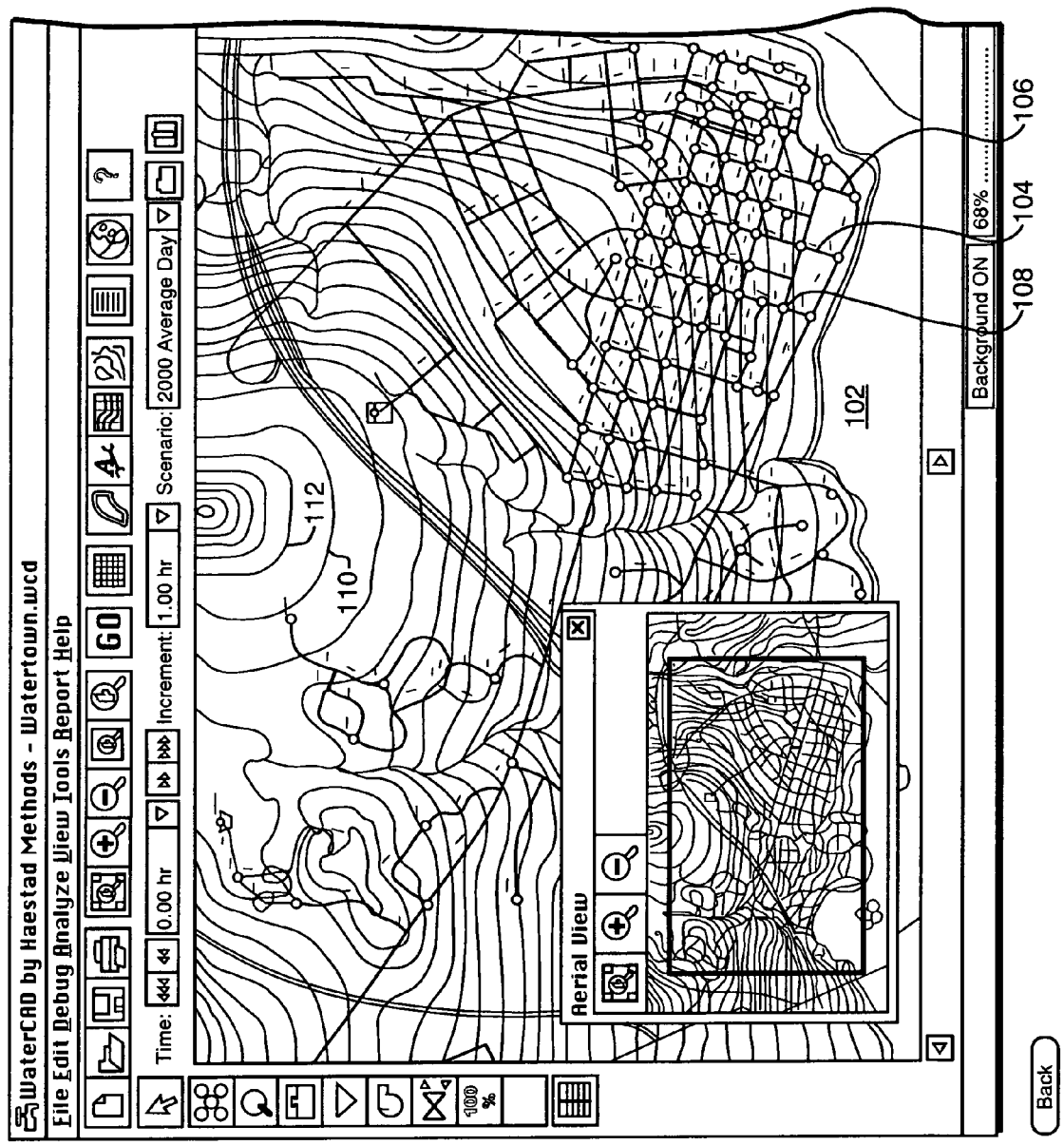
FIG. 1 is a graphic user interface (GUI) which displays a water distribution network that could be designed and optimized in accordance with the present invention.

By way of background and for purposes of a more detailed illustration, FIG. 1 depicts a graphic user interface (GUI) 100 of a water distribution network as displayed by a software tool for modeling water distribution networks. The network 102 contains pipes, such as the pipes 104 and 106 that are connected at junctions, such as the junction 108. These pipes form a water distribution network to provide water to a portion of a community. The isometric lines 110 and 112, for example, illustrate the topology of the under-lying land mass upon which the water distribution network is overlaid.

For purposes of illustration, we have described the invention with respect to a water distribution network, however, it is equally applicable and readily adaptable for use with networks such as storm drainage, sewage networks and other hydraulic applications, and these are well within the scope of the present invention.

When a modeler or engineer decides to design a new portion of a water distribution network in order to supply water or sewage facilities to a new subdivision, the engineer will typically use a software tool to generate a model of the network to determine the water supply, demand capacity, hydraulic flows and other data with respect to the operation of the water distribution network. In addition, water engineers spend much time concerned with matters of rehabilitation of existing water distribution networks. In these cases models are also developed and analyzed to determine the best method for rehabilitation of the system.

Figure 2:
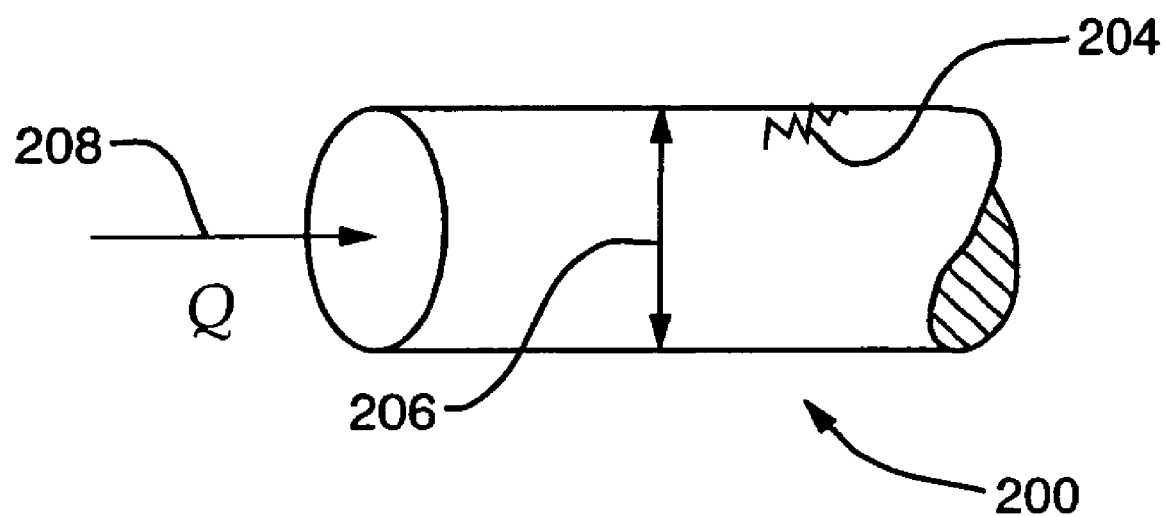
FIG. 2 is a schematic illustration of a portion of a pipe that may be used in a water distribution network that is designed and optimized in accordance with the present invention.

Water distribution systems are comprised of pipes, such as the pipe 200 of FIG. 2, as well as pumps, valves, storage tanks and many other components. As will be well understood by those skilled in the art, the hydraulic behavior of the network will depend on the parameters of the elements comprising the water distribution network. For example, pipe characteristics, such as pipe diameter illustrated at 206, and pipe roughness coefficient 204, through the pipe 200 each affect the volumetric flow rate, Q, through that pipe 200.

A water engineer often considers pipe diameter as a primary parameter that can be changed to vary the hydraulic behavior of the system. This means selecting new pipes of a certain diameter, or replacing old pipes with replacement pipes of a certain diameter. Pipe roughness also affects the flow of the water through the system, and the pipe roughness coefficient is another parameter that can be varied to affect the behavior of the system. Pipe roughness can be changed by lining or re-lining existing pipes with a certain type of material that causes the roughness coefficient to change. Typically, a lower coefficient corresponds with a smoother surface, meaning less friction, thereby increasing the overall flow through the pipe.

These practical decisions are to be made by a water engineer in designing a water distribution system, and a decision making support tool is helpful in taking these practical considerations into account so that the system may be optimized. Multiple demand loading conditions and various boundary system conditions also are typically considered by the design engineer. For example, demand-loading conditions might relate to time of day or time of year. In the summer, water demand may be greater than it is, for example, in the winter. In the morning, water demand could be greater than in the overnight hours. Thus, various demand-loading conditions are to be taken into account to accurately model the water distribution network. Other boundary system conditions may include fire flow conditions that exist when fire hydrants are tapped.

Figure 3:
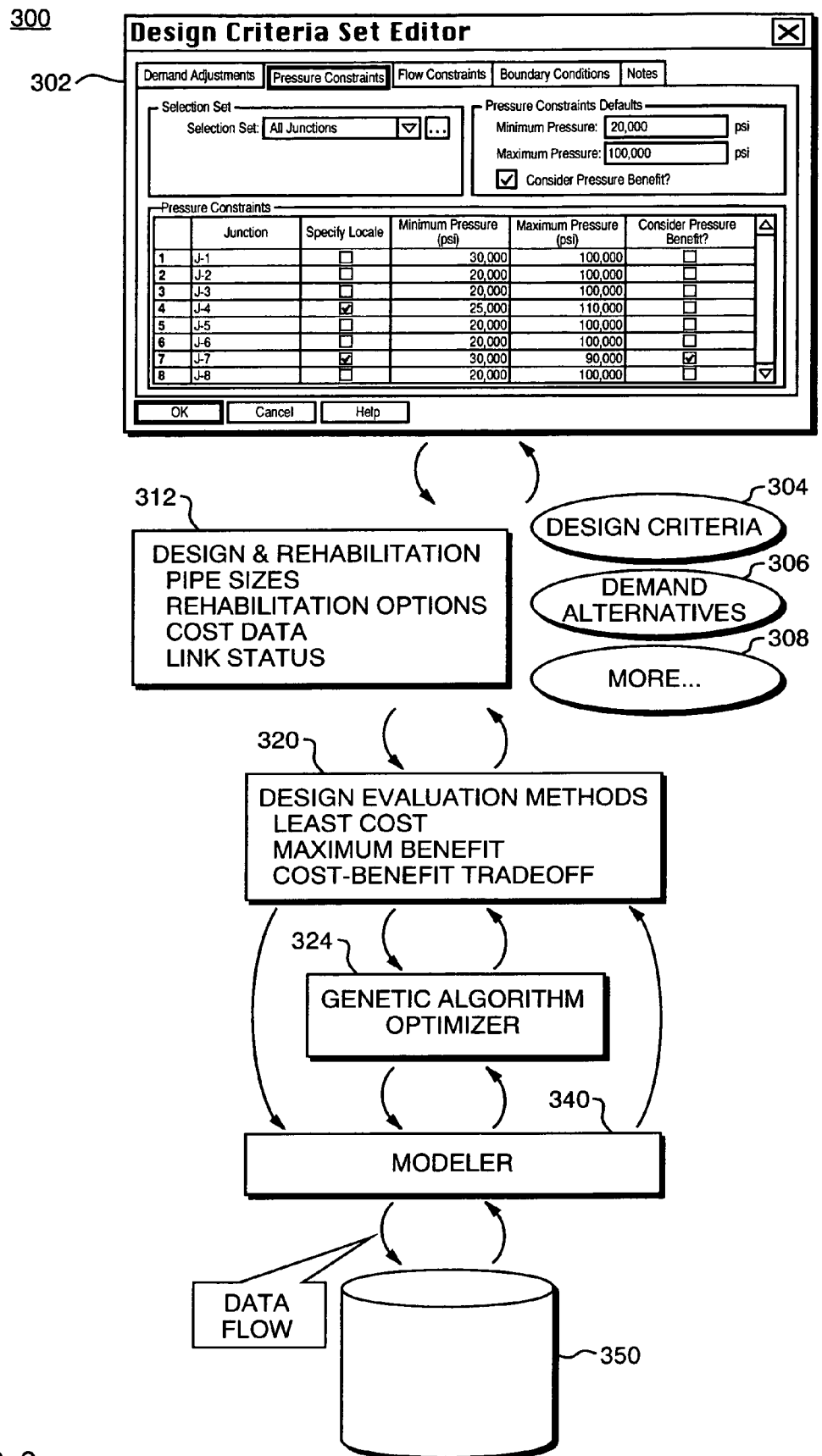
FIG. 3 is a schematic illustration of the system of the present invention.

An engineer or modeler typically prefers to optimize an entire water system (or a portion of the system) at a minimum cost, while achieving the maximum benefits of the new design. The system of the present invention provides this ability to the engineer or modeler. FIG. 3 illustrates the system 300, which includes a personal computer (PC) work station 302, on which an engineer, modeler or programmer can work to enter data and view results. For example, using the PC 302, the engineer can enter design criteria 304, demand alternatives 306 and other entries 308. In addition, the engineer can enter information regarding the design and rehabilitation of the system, for example, to improve a water distribution system a water engineer will enter the current pipe sizes and rehabilitation options as well as cost data and link status. Link status indicates whether valves are opened or closed, and could potentially include information about storage tank levels. These entries are illustrated at the block 312 of FIG. 3.

Next, the system of the present invention includes a design evaluation model 320. The design evaluation model 320 includes software for determining the least cost, the maximum benefit and a cost-benefit tradeoff for the design and rehabilitation entered by the water engineer.

More specifically, the design evaluation model 320 provides a user with an option to select any one of three optimization levels to best suit his or her project needs. In accordance with the present invention, a first model level is the least cost optimization level. The least cost design and rehabilitation is a single objective optimization. As a single objective optimization problem, the goal is to search for an optimal solution for that single objective. In this case, the optimal solution is determined as the minimum cost of a water distribution design and rehabilitation. The solution is optimal when it satisfies user-prescribed hydraulic criteria, which may include such conditions as minimum required junction pressure, maximum allowable junction pressure, maximum allowable pipe flow velocity, and maximum allowable hydraulic gradient. The user may make selections among these options using a GUI, which may be readily produced for this purpose.

As part of the least cost optimization determination, a cost objective function is performed by the design evaluation module 320 of the system of the present invention. More particularly, the cost is determined based on a number of different functions. The first is a new pipe cost, which is the cost of a new design pipe in a new portion of the network, such as in a new subdivision. The next is rehabilitation pipe cost and it is asso ciated with pipe diameter and a rehabilitation action, such as pipe re-lining; break-repair cost is the cost associated with pipe renovation or rehabilitation that must be taken to effectively improve the pipe structure condition. Each of these cost functions will now be discussed in further detail.

Total cost of a network design and rehabilitation is the sum of the new pipe cost (Cnew), rehabilitation pipe cost (Crehab) and pipe break repairing cost (Crepair). Thus the total cost is given as:

$$Ctotal = Cnew + Crehab + Crepair$$

New Pipe Cost

The cost of a new design pipe is defined as a function of pipe length. Let the total number of design pipes be DP, and let $C_k(dk)$ be the cost per unit length of the k-th pipe diameter selected from a set of available pipe diameter $D^o$ of DC choices. The new pipe cost is given as:

$$Cnew = \sum_{k=1}^{DP} c_k(dk) L_k$$

where $L_k$=length of the k-th pipe.

Rehabilitation Pipe Cost

The cost of a rehabilitation pipe is associated with the pipe diameter and the rehabilitation action. Let Ck(ek, dk) be cost per unit length of a pipe for the k-th rehabilitation action $e_k$ chosen from a set of possible action $E^o$ of EC choices for the existing pipe of diameter $d_k$. The cost of rehabilitation pipes is formulated as:

$$Crehab = \sum_{k=1}^{RP} c_k(d_k, e_k)L_k$$

where $L_k$=length of the k-th pipe and RP is the number of rehabilitation pipes.

For the pipes that are grouped into one design group, the same pipe size or rehabilitation action will be applied to the pipes. Any number of design groups can be defined in accordance with the present invention, and this allows the user great flexibility in designing and rehabilitating a large network.

Break Repairing Cost

Pipe renovation or rehabilitation will effectively improve the pipe structure condition, and consequently reduce the pipe break repair cost. For the rehabilitation pipes that the action of doing-nothing (leaving a pipe as it is) is assigned to, a cost of repairing pipe break is incurred to account for the potential cost in a planning horizon (such as 10 years). Assuming $b_j(t)$ the number of breaks per mile at year t for pipe j, Cbj the repair cost per break of pipe j. The total cost of pipe repair over a period of ny years is given as:

$$Cbreak = \sum_{j=0}^{RB} \sum_{t=0}^{uy} \frac{b_j(t)Cb_j}{(1+r)^t}$$

where RB is the number of doing-nothing pipes that may have breaks and r is the interest rate.

The second level of optimization that an engineer can select in accordance with the present invention is the maximum benefit optimization. The maximum benefit optimization determines the maximum benefit solution for design/rehabilitation for the water distribution network or portion thereof.

The benefits of a design and rehabilitation are resulted from hydraulic performance improvement (hydraulic benefit), excess hydraulic capacity (capacity benefit) and pipe rehabilitation improvement (rehabilitation benefit). The hydraulic benefit is measured by using a surrogate of the junction pressures. The hydraulic capacity benefit is modeled by the excess flow through the emitters at user-selected junctions while the rehabilitation benefit is defined as the pipe roughness improvement. Therefore, the overall benefit is noted as:

$$BTtotal = HYbenefit + CPbenefit + RHbenefit$$

Pressure Benefits

The benefit of the hydraulic performance is measured by using junction pressure (P) improvements. The pressure improvement is proposed as a ratio of pressure difference between the actual pressure and a user-defined reference pressure. The benefit is normalized by the junction demand (JQ). The factors are also introduced to enable a modeler to convert and customize the hydraulic benefit function.

$$HYbenefit = \sum_{k=1}^{ND} \left\{ a \sum_{i=1}^{RJ} \left( \frac{JQ_{i,k}}{JQtotal_k} \right) \left[ \frac{(P_{i,k} - P_{i,k}^{ref})}{P_{i,k}^{ref}} \right]^b \right\}$$

$$JQtotal_k = \sum_{i=1}^{RJ} JQ_{i,k}$$

where a and b are the user-specified factors that allow an optimization modeler to weight, convert and customize pressure improvement to hydraulic benefit.

The other variables are defined as follows:

$JQ_{j,k}$ is the demand at junction i for demand alternative k, $JQtotal_k$ is the total junction demand for demand alternative k, $P_{i,k}$ is the post-rehabilitation pressure at junction i for demand alternative k, $P_{i,k}^{ref}$ is the reference junction pressure defined by a user to evaluate the pressure improvement.

Flow Benefit

The capacity benefit resulted from a design and rehabilitation is measured by the excess flow that can be delivered to the junctions apart from the demand given at the junctions. The excess flow is modeled by using junction emitters and the benefit function is defined as:

$$CPbenefit = \sum_{k=1}^{ND} c \sum_{j=1}^{j=NE} \left( \frac{(EQ_{j,k} - EQ_{j,k}^{ref})}{EQ_{j,k}^{ref}} \right)^d$$

$EQ_{j,k}$ is the emitter flow at junction j for demand alternative k, $PQ_{j,k}^{ref}$ is the reference flow of emitter j for demand alternative k and NE is the total number of emitters while ND is the number of demand alternatives.

Rehabilitation Benefit

Rehabilitation enhances the water supply performance by increasing the pipe capacity and improving the pipe roughness. To maximize the value of funds spent on the rehabilitation, a rehabilitation action should favor the actual improvement of the pipe smoothness. Thus the rehabilitation benefit is quantified by the roughness improvement ratio and normalized by the rehabilitated pipe length.

$$RHbenefit = e \sum_{i=1}^{RP} \frac{(C_i^{new} - C_i^{old}) * L_i}{C_i^{old} * L_{total}}$$

$$L_{total} = \sum_{i=1}^{RP} L_i$$

where e is the factor that allows a modeler to weight the rehabilitation benefit by using the roughness improvement, $c_i^{new}$ is the post-rehabilitation roughness coefficient of pipe I, $C_i^{old}$ is the pre-rehabilitation roughness coefficient of pipe i, $L_i$ is the length of the design pipe i.

Unitized Benefit Functions

The benefit resulted from a design and rehabilitation can also be quantified by using the unitized average flow and pressure increase across the entire system. The benefit functions can be simply given as follows.

Average Flow Increase $$Qavg = \frac{\sum_{i=1}^{N} |Q_i| - |Q_{min}|}{N}$$

Average Pressure Increase $$Pavg = \frac{\sum_{j=1}^{JN} |P_j| - |P_{min}|}{JN}$$

The advantage of using the unitized benefit function is that a modeler is able to evaluate the average flow and pressure enhancement for the investment. It is worth being aware of the value of the dollars spent.

Optimization in level 2, which is the maximum benefit optimization, provides the maximum benefit design subject to the budget available for a project.

In making the design decisions, an engineer will analyze each design trial solution by a number of hydraulic simulation runs corresponding to the multiple demand conditions, the system responses, such as junction pressures, flow velocities and hydraulic gradients. And these will be checked against user-specified design criteria. Some of the design constraints that are taken into account in the design/rehabilitation criteria are junction pressure constraints, which specify the minimum required and the maximum allowable junction pressures. More specifically, junction pressure is often required to maintain greater than a minimum pressure level to ensure adequate water service and less than a maximum pressure level to reduce water leakage in a system. Junction pressure constraint are given as:

$$H_{i,j}^{min} \leq H_{i,j} \leq H_{i,j}^{max}, \forall t, i=1, \ldots, NJ; j=1, \ldots, NDM$$

where $H_{i,j}$=hydraulic head a junction i for demand load in case j; NJ=number of junctions in the system (excluding fixed grade junctions); $H_{i,j}^{min}$, $H_{i,j}^{max}$=minimum required and maximum allowable hydraulic pressures at junction 1 for demand loading case j; and NDM=number of demand loading cases. These junction pressure constraints are entered into the design and rehabilitation criteria selected by the user prior to the simulation runs. Another constraint is that of flow velocity. The flow velocity constraint gives the maximum allowable pipe flow velocity. More specifically, a design and rehabilitation solution is also constrained by a set of pipe flow criteria that are often given as maximum allowable flow velocity and a maximum allowable hydraulic grade or slope, given as:

$$V_{i,j} \leq V_{i,j}^{max}, \forall t, i=1, \ldots, NP; j=1, \ldots, NDM$$

$$HG_{i,j} \leq HG_{i,j}^{max}, \forall t, i=1, \ldots, NP; j=1, \ldots, NDM$$

where $V_{i,j}$=flow velocity of pipe i for demand loading case j; $V_{i,j}^{max}$=maximum allowable flow velocity of pipe i for demand loading case j; NP=number of constraint pipes in system; $HG_{i,j}$=hydraulic gradient (slope) of pipe i for demand loading case j and $HG_{i,j}^{max}$=maximum allowable hydraulic gradient of pipe i for demand loading case j.

In addition, hydraulic gradient constraints are taken into account in the design/rehabilitation criteria and this constraint specifies the maximum allowable hydraulic gradients for the pipes.

The fund constraint is the maximum available fund for the design and/or rehabilitation of the project. This is also considered a budget constraint. Water utilities are often constrained by a budget for a new subdivision design and/or the rehabilitation of an existing water system. When the optimization is conducted to maximize the value or to benefit of the design, the optimal solution will be constrained by the available funding. It is given as follows:

$$C_{total} \leq Fund^{max}$$

Another constraint is the pipe size constraint.

The third optimization level provided in accordance with the present invention, is the cost benefit tradeoff optimization. The cost benefit tradeoff optimization is formulated to determine the design of optimal tradeoff between the cost and benefit subject to the funding available for design and/or rehabilitation. A user is able to customize the benefit functions and specify the maximum affordable budget.

In accordance with the present invention, the software program application of the present invention includes a genetic algorithm application program, in the genetic algorithm optimizer 324 of FIG. 3. A competent genetic algorithm is employed to search for the optimal solution by maximizing the design benefit while meeting the hydraulic criteria as in model level 1 and the budget available for the design project. The program comprises a genetic search paradigm based upon the principles of natural evolution and biological reproduction, which searches for optimal pipe sizes and rehabilitation actions. Though not limiting to the invention, one example of a competent genetic algorithm was described in Wu and Simpson (2001), "Competent Genetic Algorithm Optimization of Water Distribution Systems." *Journal of computing in Civil Engineering*, ASCE, Volume 15, No. 2, pp. 89-101, which is incorporated by reference herein. A fast, messy genetic algorithm is another example, though the invention may be implemented with other types of genetic algorithms. Thus, once the calculations in the above equations are performed, the results are searched using the genetic search paradigm of the present invention. The genetic search paradigm searches through the results of the equations just described. The results of the equations are evaluated by the genetic algorithm program, as constrained by the design criteria of junction pressures, pipe flow velocity and hydraulic gradients, to determine best fit solutions for the single objective optimization levels.

The multiple objective optimization, on the other hand, involves computing the tradeoff between the cost and benefit, subject to the maximum budget and provides the user multiple non-inferior solutions. A specific number of top solutions can be specified up to a maximum of population size, and the system of the present invention can provide reports on multiple solutions. Multiple solutions can be used for many purposes, such as sensitivity studies and different scenario runs.

The system of the present invention also provides the user with great flexibility during the simulation. The system can also be set up to run a manual adjustment of the design variables and the user is able to use the manual run feature for sensitivity analysis and refining results after the genetic algorithm optimization. The user can indicate whether he wishes to create a new physical alternative from any one of the saved solutions from the results of a genetic algorithm run.

As noted, the design action is introduced as a design variable for optimizing the rehabilitation alternatives. The rehabilitation alternatives can include cleaning, re-lining, replacement and parallel pipe-additions for existing pipes. A modeler can define a set of possible actions that can be applied to a group of pipes. The pipes within one group will have the same rehabilitation action. In this way, the network can be optimized without having to cause all pipes in the network to be of the same diameter and there is no limit on the number of pipe groups that can be defined.

Thus, the problem as formulated is a multi-objective optimization problem. Both the cost and the benefit objective functions must be resolved. There is no single optimal solution that may satisfy the global optimality of both objectives, but a set of Paretooptimal solutions, each of the solutions designates a non-inferior or non-dominated solution that cannot be improved without sacrificing the other objectives. In accordance with the present invention, the genetic algorithm module of the software 324 incorporates a competent genetic algorithm, which is used to locate the Pareto-optimal solutions for the objectives specified.

Multi-objective optimization, for example, locates the non-inferior or non-dominant solutions in solution space that is more than one solution is determined. Solution A is called non-inferior to solution B if, and only if, solution A is no worse than solution B for all of the objectives. Solution A dominates solution B in such a case. It is also sometimes stated that solution A is a non-dominated solution in that instance. A global, non-dominated solution, such as solution A in the example, is defined as the solution that is no worse than any other feasible solution in all of the objectives. There are multiple global non-dominated solutions for a multi-objective optimization problem. In accordance with the present invention, the multi-objective optimization searches for all of the global, non-dominated or non-inferior solutions also known as the Pareto-optimal or the Pareto-optimal front of the solution space.

More specifically, the goal of single objective optimization is the search for an optimal least cost solution. In contrast, multi-objective optimization has two goals during the search process. One goal is to find a set of Pareto-optimal solutions as close as possible to the Pareto-optimal front. The second goal is to maintain a set of Pareto-optimal solutions as diverse as possible. In the single-objective optimization problem, the solution is evaluated by an objective value in that it directly contributes to the fitness of the corresponding genotype solution. However, the fitness of a solution for multi-objective optimization problems is determined by the solution dominance that can be defined as the number of solutions dominated among the current population solutions. The stronger the dominance, the greater the fitness assigned to a solution.

Figure 4:
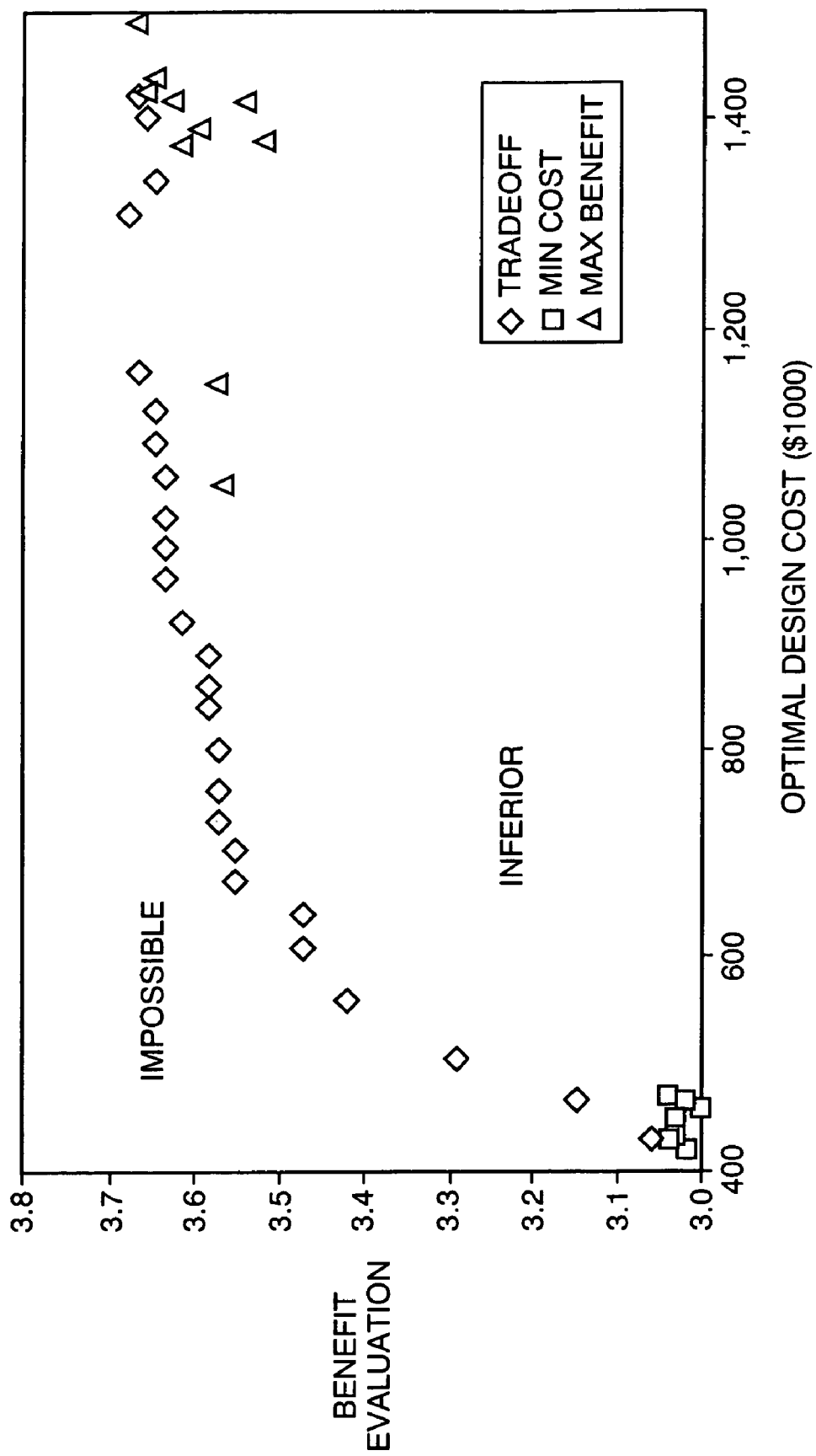
FIG. 4 is a graph plotting optimal design cost versus benefit evaluation of various optimization levels of the present invention.

The second aspect of optimization is after identifying the Pareto-optimal solutions, the diversity of those Pareto-optimal solutions is also important. Dealing with multi-objective optimization, such as minimizing cost and maximizing benefit for a water distribution system it is anticipated that optimal tradeoff solutions are found and uniformly distributed for the entire range of cost budget. This is normally achieved using a method of fitness sharing or solution clustering. In accordance with the present invention, a multi-objective competent genetic algorithm has been integrated with a hydraulic network solver. The integrated approach provides a powerful tool to assist hydraulic engineers to practically and efficiently design a water distribution system. It offers capability of three levels of optimization design analysis including minimum cost design, maximum benefit design and cost benefit tradeoff design optimization. These three levels of optimization are illustrated in the graph of FIG. 4, which illustrates optimal design cost in thousands of dollars on the x axis as plotted against benefit evaluation on the y axis. The diamond shape illustrates the cost-benefit tradeoff solutions. The minimum cost is indicated by the square and the maximum benefit is indicated by the triangle. FIG. 4 further illustrates that the single objective optimization can only result in the optimal or near optimal solutions for either least cost or maximum benefit criteria. For instance, the least cost optimal solutions are identified at the lower left corner (corresponding to the lower cost only) in square while the maximum benefit optimal solutions are located at the top right corner (corresponding to greater benefit only) in triangle. In contrast, the multi-objective approach identifies the tradeoff optimal solutions across the whole cost range from the minimum to maximum budget. An engineer is able to make a better decision by evaluating the Pareto optimal solutions according to his budget and many other non-quantifiable decision criteria.

Figure 5:
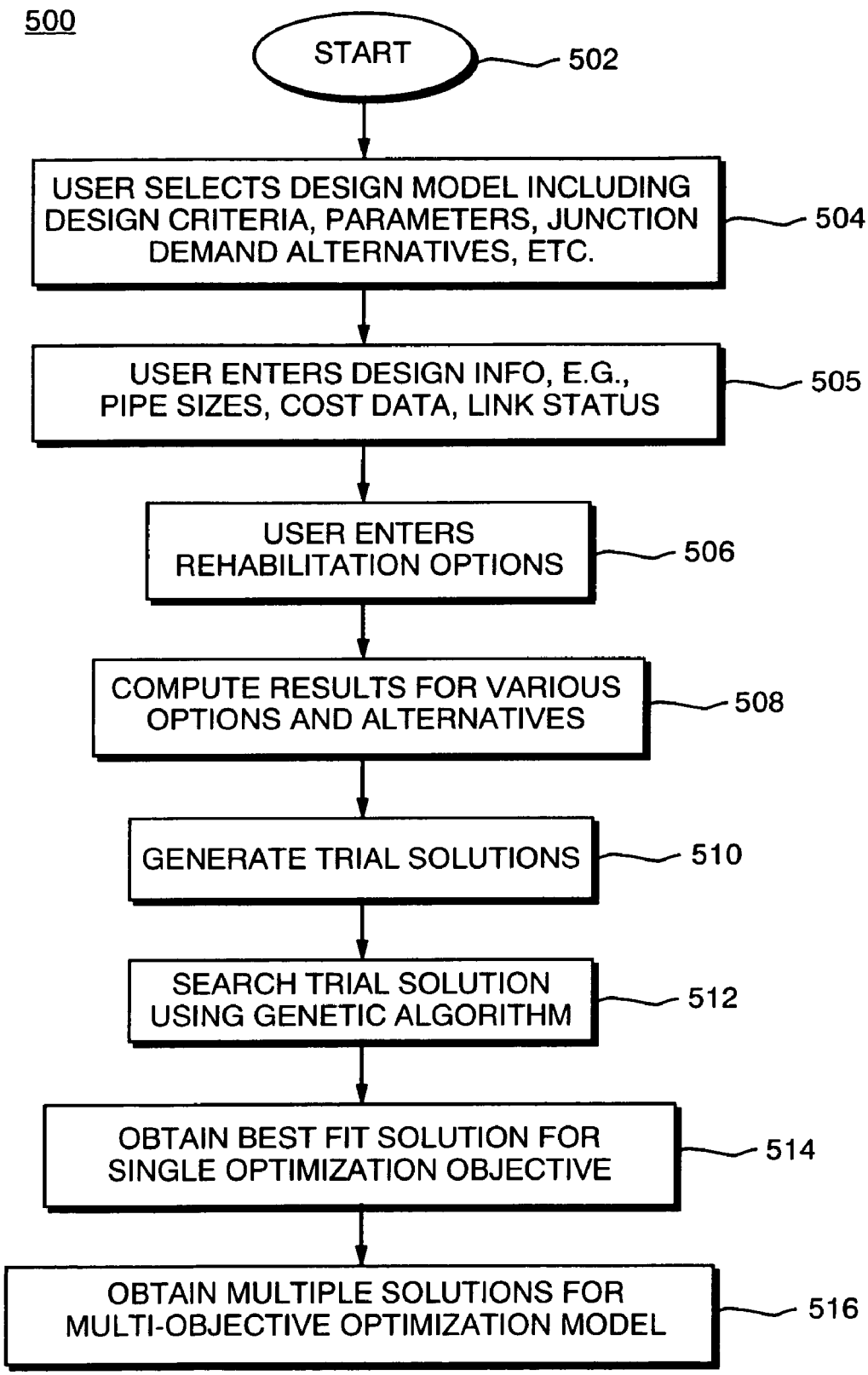
FIG. 5 is a flow chart of a procedure illustrating the method of the present invention.

In accordance with the method of the present invention, the procedure 500 illustrated in FIG. 5 shows a flow chart beginning at start (502) and proceeding to step 504 in which the program prompts the user to select a design model, such as least cost, maximum capacity, or the multiple objective tradeoff. The user is also prompted to enter design criteria, parameters, demand alternatives, as well as demand conditions such as fire flow conditions, or other conditions such as "pipe out of service" or "pump power loss."

Next, at step 505, the user is prompted to add further information about the system including pipe sizes, cost data and link status. At step 506, the user is prompted to select rehabilitation options, such as pipe re-lining, pipe repair, and the like.

Once the data is entered, the method of the present invention includes computing the results of the various cost and benefit and rehabilitation functions, as illustrated in step 508. This generates a set of trial solutions, step 510. The genetic search engine then searches the trial solutions (step 512) for the best-fit solution in the case of a single optimization objection, as illustrated at step 514. In the case of a multiple-objective optimization, the Pareto-optimal solutions are located and the best of those (including a variety) are maintained for analysis by the user.

It should be understood that the method and system of the present invention handles complex design problems such as rehabilitation, pipe sizing and rehabilitation of either the entire (or part of) a water distribution network under multiple loading and scenario conditions. The method and system of the present invention offer multi-level optimization analysis for single or multi-objective functions that enable engineers to effectively and efficiently conduct practical design and planning of water systems. The integrated approach has been demonstrated as a powerful tool for optimization modeling of a water distribution system design. It allows engineers to conduct the practical designing by taking into account important engineering criteria and conditions and efficiently evaluates millions of design alternatives in a rapid manner and expedites the design process, thus improving the productivity and solution quality of a planning and design process.

It should be further understood, that the present invention may also be readily adapted to incorporate other parameters, or boundary conditions, not specifically mentioned herein, but that may be determined to be useful in describing a water distribution network. In such a case, the present invention may be adapted to take those parameters into account in determining optimized design for the network model.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of designing and rehabilitating a water distribution system, including the steps of:
   (A) providing a user interface with which a user makes selections;
   (B) passing user selected information including a design model and at least one of least cost, maximum benefit and multi-objective cost-benefit trade off as an objective for a proposed new design or rehabilitation of a water distribution system to a design evaluation module, passing user-prescribed hydraulic criteria, including at least one of minimum required junction pressure, maximum allowable junction pressure, maximum allowable pipe flow velocity, and maximum hydraulic gradient for the water distribution system to said design evaluation module, and passing demand and operating condition information including at least one of pipe sizes, cost data and link status to said design evaluation module;
   (C) computing at least one of a cost or a rehabilitation benefit of said proposed new design or rehabilitation for said design model and demand and operation conditions, using a genetic algorithm program application, and determining one or more solutions for the proposed new design and rehabilitation that satisfies the user-prescribed hydraulic criteria for the design model selected;
   (D) running one or more hydraulic simulations for each solution computed;
   (E) configuring said user interface to provide a representation of said one or more simulations for evaluation by a user; and
   wherein computing said rehabilitation benefit includes a step of calculating the hydraulic performance improvement benefit by determining junction pressure (P) improvements, wherein pressure improvement is a ratio of pressure difference between the actual pressure and a user-defined reference pressure, and the benefit is divided by the junction demand (JQ), introducing factors enabling a modeler to convert and customize the hydraulic benefit function as follows:

$$HYbenefit = \sum_{k=1}^{ND} \left\{ a \sum_{i=1}^{RJ} \left( \frac{JQ_{i,k}}{JQtotal_k} \right) \left[ \frac{(P_{i,k} - P_{i,k}^{ref})}{P_{i,k}^{ref}} \right]^b \right\}$$

$$JQtotal_k = \sum_{i=1}^{RJ} JQ_{i,k}$$

where a and b are user-specified factors that allow a user to weight, convert and customize pressure improvement to hydraulic benefit, and where:
$JQ_{i,k}$ is the demand at junction i for demand alternative k, $JQtotal_k$ is the total junction demand for demand alternative k, $P_{i,k}$ is the post-rehabilitation pressure at junction i for demand alternative k, $P_{i,k}^{ref}$ is the reference junction pressure defined by a user to evaluate the pressure improvement.

2. The method of designing and rehabilitating a water distribution system as defined in claim 1, including the further step of:
   including in computing the cost of said proposed new design or rehabilitation the sum of a new pipe cost, rehabilitation pipe cost and pipe break-repairing cost.

3. The method of designing and rehabilitating a water distribution system as defined in claim 1, including the further step of:
   employing said genetic algorithm program application to determine a set of non-inferior solutions for a proposed new design or rehabilitation of said water distribution system.

4. The method of designing and rehabilitating a water distribution system as defined in claim 3, including the further step of:
   maintaining a diverse set of non-inferior solutions.

5. The method of designing and rehabilitating a water distribution system as defined in claim 4, including the further step of:
   maintaining said diverse set of non-inferior solutions using fitness sharing techniques and solution clustering techniques.

6. The method of designing and rehabilitating a water distribution system as defined in claim 1, including the further step of:
   generating trial solutions using at least one of the following design constraints:
   (A) pipe size constraints;
   (B) pipe flow constraints; and
   (C) budget constraints.

7. A method of designing and rehabilitating a water distribution system, including the steps of:
   (A) providing a user interface for:
      1. selecting at least one of least cost, maximum capacity and multi-objective trade off as an objective for a proposed new design or rehabilitation of a water distribution system represented in a design model;
      2. selecting user-prescribed hydraulic criteria, including at least one of minimum required junction pressure, maximum allowable junction pressure, maximum allowable pipe flow velocity, and maximum hydraulic gradient for the water distribution system; and
      selecting demand conditions and operating conditions including at least one of pipe sizes, cost data and link status; and
   (B) employing a genetic algorithm program application for generating one or more improved design solutions for the proposed new design or rehabilitation that satisfies the user-prescribed hydraulic constraint criteria and the demand conditions and operating conditions for the design model selected, the genetic algorithm program application generating the one or more improved design solutions by considering a plurality of trial solutions, each trial solution having a computed benefit and cost, wherein the benefit is computed as a combination of, at least, hydraulic performance improvement, excess hydraulic capacity, and pipe rehabilitation improvement, wherein hydraulic performance improvement (HYbenefit) is computed as $$HYbenefit = \sum_{k=1}^{ND} \left\{ a \sum_{i=1}^{RJ} \left( \frac{JQ_{i,k}}{JQtotal_k} \right) \left[ \frac{(P_{i,k} - P_{i,k}^{ref})}{P_{i,k}^{ref}} \right]^b \right\}$$

$$JQtotal_k = \sum_{i=1}^{RJ} JQ_{i,k}$$

where a and b are user-specified factors, $JQ_{i,k}$ is a demand at junction i for a demand alternative k, $JQtotal_k$ is a total junction demand for the demand alternative k, $P_{i,k}$ is a post-rehabilitation pressure at junction i for the demand alternative k, $P_{i,k}^{ref}$ is a reference junction pressure, and ND is a number of demand alternatives.

8. The method of claim 7 wherein cost is a total cost and is computed as a sum of a new pipe cost, a rehabilitation pipe cost and a pipe break repair cost.

9. The method of claim 8 wherein rehabilitation pipe cost is based on the diameter of a pipe and a rehabilitation action associated with the pipe.

10. The method of claim 8 wherein pipe break repair cost is a projected cost of repairing pipes that have not been rehabilitated.

11. The method of claim 7 wherein the genetic algorithm program application generates the one or more improved design solutions by maintaining a diverse set of non-inferior solutions.

12. The method of claim 7 wherein the genetic algorithm program application generates the one or more improved design solutions to meet a budget constraint, the solutions proving maximum benefit possible under the budget constraint.

13. A method of designing and rehabilitating a water distribution system, including the steps of:

(A) providing a user interface for:
  1. selecting at least one of least cost, maximum capacity and multi-objective trade off as an objective for a proposed new design or rehabilitation of a water distribution system represented in a design model;
  2. selecting user-prescribed hydraulic criteria, including at least one of minimum required junction pressure, maximum allowable junction pressure, maximum allowable pipe flow velocity, and maximum hydraulic gradient for the water distribution system; and
  3. selecting demand conditions and operating conditions including at least one of pipe sizes, cost data and link status; and (B) employing a genetic algorithm program application for generating one or more improved design solutions for the proposed new design or rehabilitation that satisfies the user-prescribed hydraulic constraint criteria and the demand conditions and operating conditions for the design model selected, the genetic algorithm program application generating the one or more improved design solutions by considering a plurality of trial solutions, each trial solution having a computed benefit and cost, wherein the benefit is computed as a combination of, at least, hydraulic performance improvement, excess hydraulic capacity, and pipe rehabilitation improvement, wherein excess hydraulic capacity (CPbenefit) is computed as $$CPbenefit = \sum_{k=1}^{ND} c \sum_{j=1}^{j=NE} \left( \frac{(EQ_{j,k} - EQ_{j,k}^{ref})}{EQ_{j,k}^{ref}} \right)^d$$

where $EQ_{j,k}$ is an emitter flow at junction j for a demand alternative k, $PQ_{j,k}^{ref}$ is a reference flow of emitter j for the demand alternative k, NE is a total number of emitters, and ND is a number of demand alternatives.

14. A method of designing and rehabilitating a water distribution system, including the steps of:

(A) providing a user interface for:
  1. selecting at least one of least cost, maximum capacity and multi-objective trade off as an objective for a proposed new design or rehabilitation of a water distribution system represented in a design model;
  2. selecting user-prescribed hydraulic criteria, including at least one of minimum required junction pressure, maximum allowable junction pressure, maximum allowable pipe flow velocity, and maximum hydraulic gradient for the water distribution system; and
  3. selecting demand conditions and operating conditions including at least one of pipe sizes, cost data and link status; and (B) employing a genetic algorithm program application for generating one or more improved design solutions for the proposed new design or rehabilitation that satisfies the user-prescribed hydraulic constraint criteria and the demand conditions and operating conditions for the design model selected, the genetic algorithm program application generating the one or more improved design solutions by considering a plurality of trial solutions, each trial solution having a computed benefit and cost, wherein the benefit is computed as a combination of, at least, hydraulic performance improvement, excess hydraulic capacity, and pipe rehabilitation improvement, wherein hydraulic performance improvement (RHbenefit) is computed as $$RHbenefit = e \sum_{i=1}^{RP} \frac{(C_i^{new} - C_i^{old}) * L_i}{C_i^{old} * L_{total}}$$

$$L_{total} = \sum_{i=1}^{RP} L_i$$

where e is a factor that weights the rehabilitation benefit, $C_i^{new}$ is a post-rehabilitation roughness coefficient of pipe I, $C_i^{old}$ is a pre-rehabilitation roughness coefficient of pipe i, and $L_i$ is the length of pipe i.

* * * * *